(12) United States Patent
Pursifull

(10) Patent No.: US 8,347,862 B2
(45) Date of Patent: Jan. 8, 2013

(54) SYSTEM AND METHOD FOR INJECTING FUEL TO A GASEOUS FUELED ENGINE

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 12/645,760

(22) Filed: Dec. 23, 2009

(65) Prior Publication Data

US 2011/0132330 A1 Jun. 9, 2011

(51) Int. Cl.
*F02M 51/00* (2006.01)

(52) U.S. Cl. ......................... 123/478; 123/491

(58) Field of Classification Search ............... 123/434, 123/445, 472, 478, 491, 27 GE, 480, 526, 123/527; 701/104, 110
See application file for complete search history.

(56) References Cited

U.S. PATENT DOCUMENTS

| | | | | |
|---|---|---|---|---|
| 4,541,390 A | * | 9/1985 | Steinbrenner et al. | 123/491 |
| 5,076,238 A | * | 12/1991 | Rosenau et al. | 123/491 |
| 5,809,446 A | * | 9/1998 | Visser | 701/103 |
| 5,937,829 A | * | 8/1999 | Endou | 123/497 |
| 6,202,608 B1 | | 3/2001 | Yamaki et al. | |
| 6,332,453 B1 | | 12/2001 | Yamakado et al. | |
| 6,518,763 B2 | * | 2/2003 | Sollart | 324/378 |
| 6,543,220 B2 | | 4/2003 | Yoshida et al. | |
| 6,575,143 B2 | * | 6/2003 | Uemura et al. | 123/490 |
| 6,854,450 B2 | * | 2/2005 | Kitagawa et al. | 123/491 |
| 6,938,599 B2 | | 9/2005 | Senda et al. | |
| 7,216,626 B2 | * | 5/2007 | Araki et al. | 123/406.47 |
| 7,231,908 B2 | * | 6/2007 | Namari et al. | 123/491 |
| 2002/0157652 A1 | * | 10/2002 | Hoshi | 123/491 |
| 2003/0037771 A1 | * | 2/2003 | Yuya et al. | 123/491 |
| 2007/0028898 A1 | * | 2/2007 | Namari et al. | 123/491 |
| 2008/0047529 A1 | * | 2/2008 | Cooke et al. | 123/478 |
| 2008/0319584 A1 | | 12/2008 | Fischer et al. | |
| 2010/0125400 A1 | * | 5/2010 | Mc Donald et al. | 701/103 |

OTHER PUBLICATIONS

McDonald, Dennis, "Engine Position Tracking At Shutdown," SAE Technical Paper Series No. 2005-01-0048, SAE World Congress, Detroit, MI, Apr. 11-14, 2005, 19 pages.

* cited by examiner

*Primary Examiner* — Stephen K Cronin
*Assistant Examiner* — Sizo Vilakazi
(74) *Attorney, Agent, or Firm* — Julia Voutyras; Alleman Hall McCoy Russell & Tuttle LLP

(57) ABSTRACT

A method for controlling injection timing for a gaseous fuel injector is described. In one example, the fuel injector is opened with a saturating fuel injector at a predetermined crankshaft angular position. In one embodiment, the predetermined crankshaft angular position corresponds to at least one crankshaft angular position where battery voltage increases during engine cranking.

15 Claims, 7 Drawing Sheets

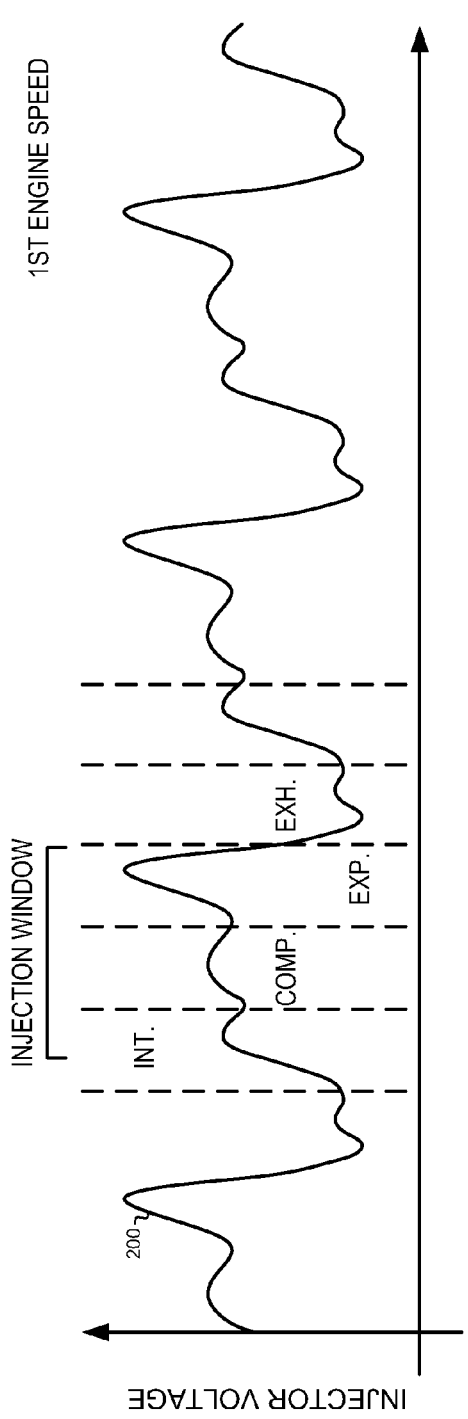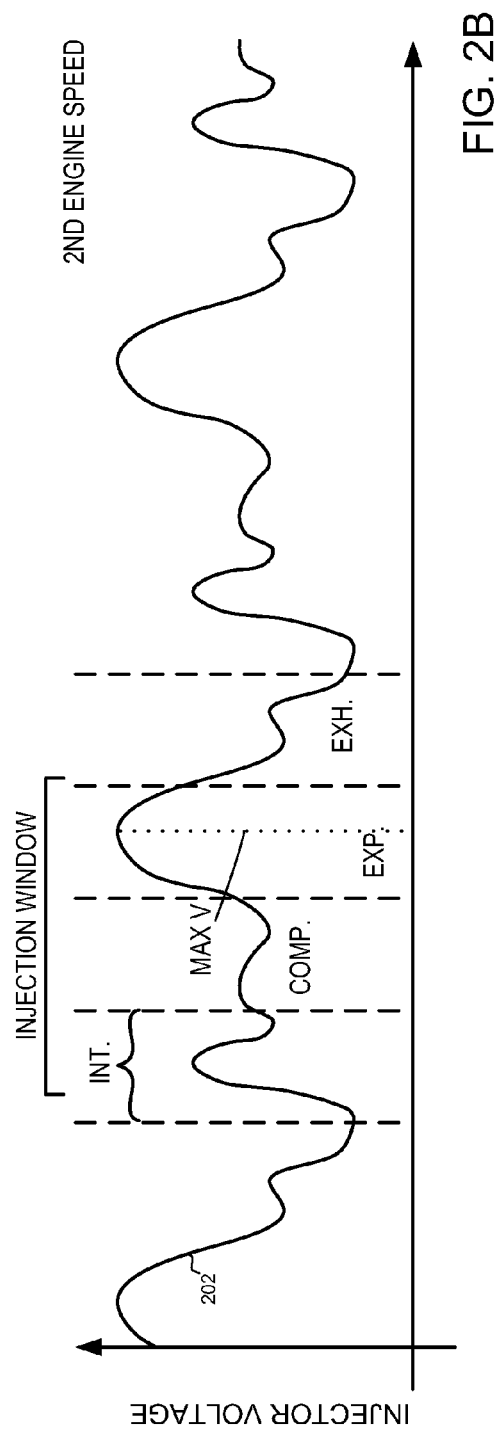

SYSTEM AND METHOD FOR INJECTING FUEL TO A GASEOUS FUELED ENGINE

TECHNICAL FIELD

The present application relates to the field of automotive fuel control systems and methods.

BACKGROUND AND SUMMARY

Gaseous fueled internal combustion engines are one way to reduce oil consumption and reduce engine emissions. Gaseous fueled engines may provide several advantages over liquid fuels such as gasoline or alcohol. For example, gaseous fuels vaporize well at low temperatures. Further, gaseous fuels may combust more completely because the fuel does not condense in the engine before combustion. Therefore, gaseous fuels may produce fewer undesirable emissions during some conditions.

However, the present inventors have determined that it may be difficult to start a gaseous fueled engine at low temperatures because fuel injectors resist movement at lower temperatures and because vehicle voltage may drop to a level where it may be difficult to operate the gaseous fuel injector. In particular, as engine cranking torque increases, the engine speed and battery voltage are reduced. For example, during engine cranking, a starter rotates the crankshaft of an engine. While the crankshaft rotates, engine cylinders induct and exhaust air for combining with fuel so as to provide a combustible mixture with which to operate the engine. During crankshaft rotation, air enters a cylinder during an intake stroke and is compressed during a compression stroke. The engine starter torque increases as the cylinder piston approached top dead center of the compression stroke because work is required to compress the air in the cylinder. Further, motor torque is directly proportional to motor current. As starter torque increases, the battery supplies increased current, and the battery voltage is reduced. If the battery voltage goes below a minimum operating voltage for the gaseous fuel injector, the fuel injector may not operate and the engine may not start.

In addition, it should be noted that although some types of fuel injectors may produce more fuel injector opening force at lower temperatures (e.g., peak and hold fuel injectors—fuel injectors that are actuated at a higher voltage and held open at a lower voltage), this type of fuel injector may require more expensive electronic driver technology. Therefore, peak and hold fuel injectors may be less desirable. Further, peak and hold fuel injectors are used less frequently as port injectors as saturating injectors are being developed that have lower minimum operating voltage. However, saturating fuel injectors have not been developed that operate at low minimum operating voltage that may be experienced at low temperatures.

The inventors herein have developed a method for injecting fuel to an engine, comprising: during an engine start in a first mode, adjusting injection timing of a gaseous fuel injector to deliver at least a portion of gaseous fuel to a cylinder of an engine during different crankshaft intervals; and aligning an opening of said gaseous fuel injector to a crankshaft angle where a supply voltage of said gaseous fuel injector exceeds a threshold voltage.

Engine cold starting of a gaseous fueled engine can be improved by adjusting start of injection timing (e.g., the crankshaft angle at which a fuel injector is commanded to begin to deliver fuel to an engine during a cylinder cycle) to coincide with a time during which voltage supplied to a fuel injector is at a higher level. By starting fuel injection at a time when voltage applied to a fuel injector is higher, the possibility of the fuel injector operating and injecting fuel can increase. For example, for a single cylinder engine, battery voltage can increase while a starter is engaged during an expansion stroke of a cylinder. During an expansion stroke, the compressed cylinder gases expand to accelerate the crankshaft and lower current drawn by the starter. Therefore, it may be beneficial during some conditions to actuate a gaseous fuel injector during an expansion stroke of a cylinder or at another crankshaft interval when voltage supplied to a fuel injector is higher. In this way, lower cost saturation type fuel injectors may be operated such that gaseous fuel is delivered to the engine even when battery voltage is not as high as is desirable. In the case of a multi-cylinder engine, the gas torques of all cylinders are superimposed to yield a net gas torque. The region of minimum gas torque may yield the fastest crank speed, the lowest starter current, and the highest battery voltage.

In the case of a four cylinder, four-stroke cycle, even firing engine, the higher battery voltage and lower battery voltage portion of the engine cranking cycle repeats every 180 crankshaft degrees. Thus, the crankshaft angular region or window when the battery voltage exceeds the minimum injector operating voltage can be determined every 180 crankshaft degrees.

The present description may provide several advantages. Specifically, the approach may improve engine starting and emissions. Further, the method can reduce system cost because a peak and hold circuitry is not required to operate the gaseous fuel injector. Further still, the vehicle power system may not have to be upgraded to operate fuel injectors during cold conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows a plot of simulated fuel injector voltage during a cold start of an engine, the engine at a first speed;

FIG. 2B shows a plot of simulated fuel injector voltage during a cold start of an engine, the engine at a second speed;

DETAILED DESCRIPTION OF THE DEPICTED EMBODIMENTS

Figure 1:
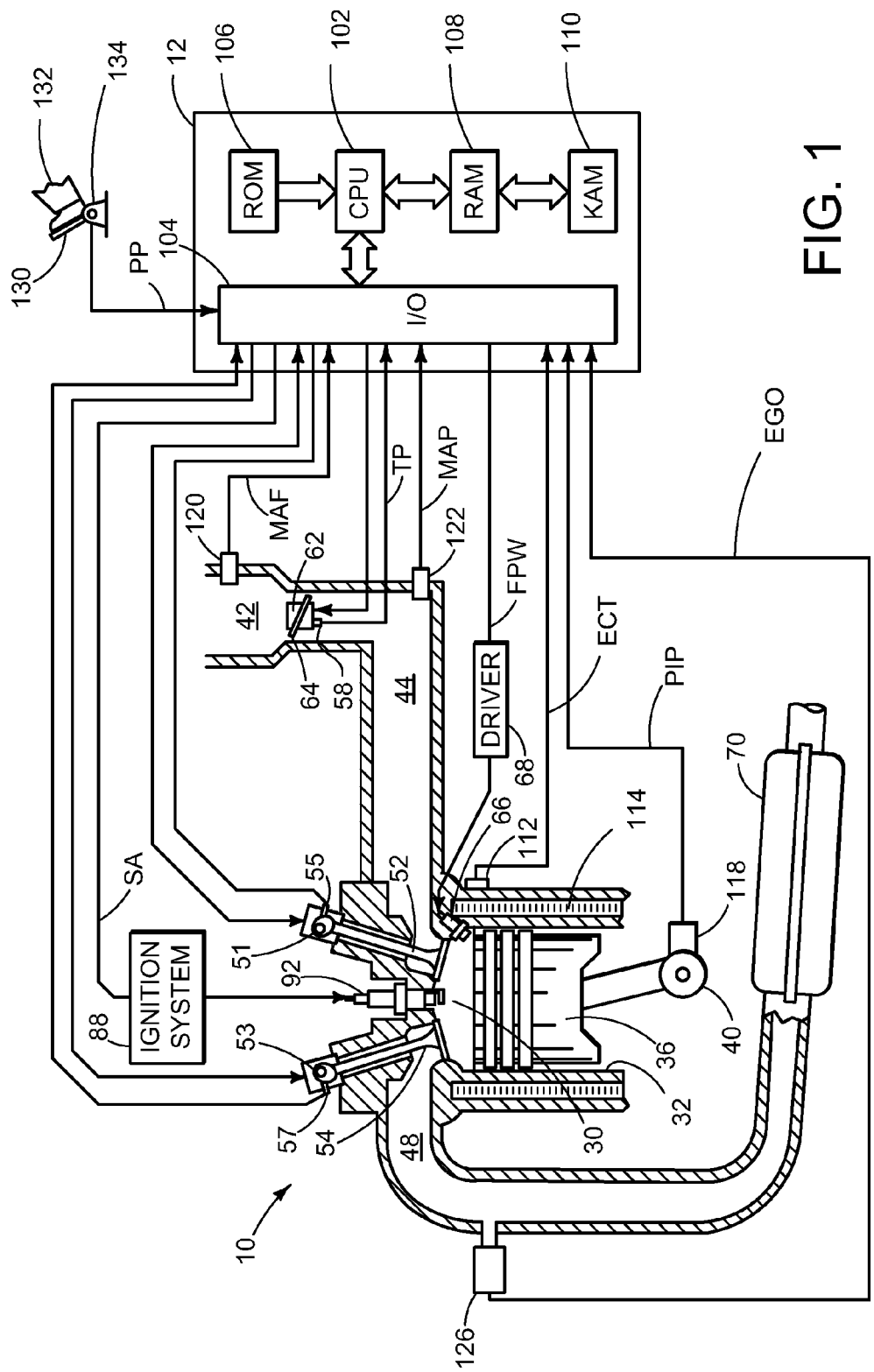
FIG. 1 shows a schematic view of an exemplary embodiment of a gasoline direct injection engine.

FIG. 1 shows an exemplary embodiment of a gasoline direct injection engine system generally at 10. Specifically, internal combustion engine 10 comprises a plurality of cylinders, one cylinder of which is shown in FIG. 1. Engine 10 is controlled by electronic engine controller 12. Engine 10 includes combustion chamber 30 and cylinder walls 32 with piston 36 positioned therein and connected to crankshaft 40. Combustion chamber 30 communicates with an intake manifold 44 and an exhaust manifold 48 via respective intake valve 52 and exhaust valve 54. Intake valve 52 is operated by variable position cam 51. Exhaust valve 54 is operated by variable position cam 53. The position of intake cam 51 is sensed by cam sensor 55. The position of exhaust cam 53 is sensed by cam sensor 57.

Intake manifold 44 communicates with throttle body 62 via throttle plate 64. In one embodiment, an electronically controlled throttle can be used. In one embodiment, the throttle is electronically controlled to periodically, or continuously, maintain a specified vacuum level in intake manifold 44. Alternatively, throttle body 62 and throttle plate 64 may be omitted.

Combustion chamber 30 is also shown having fuel injector 66 coupled thereto for delivering fuel in proportion to the pulse width of signal (fpw) from controller 12. Fuel is delivered to saturating fuel injector 66 by a conventional gaseous fuel system (not shown) including a fuel tank and fuel rail (not shown). In the case of direct injection engines, as shown in FIG. 1, a fuel pressure intensifier may also be included to increase fuel pressure. In alternate embodiments, gaseous fuel may be port injected to each cylinder, or a central fuel injector may supply fuel to all cylinders. Fuel injector 66 is driven by current provided by driver circuit 68.

Spark plug 34 provides an ignition source for the contents of combustion chamber 30. Energy for creating a spark is provided by ignition system 88. Controller 12 adjusts the charging of ignition coils that provide voltage to spark plug 92.

In the depicted embodiment, controller 12 is a conventional microcomputer, and includes a microprocessor unit 102, input/output ports 104, read only memory 106, random access memory 108, and keep alive memory 110. Microprocessor 102 is electronically programmable and capable of executing the routines described herein.

Controller 12 receives various signals from sensors coupled to engine 10, including but not limited to: measurements of induced mass airflow (MAF) from mass airflow sensor 120; engine coolant temperature (ECT) from temperature sensor 112 coupled to cooling jacket 114; a measurement of manifold pressure (MAP) from manifold pressure sensor 122 coupled to intake manifold 44; a measurement of throttle position (TP) from throttle position sensor 58 coupled to throttle plate 64; and a profile ignition pickup signal (PIP) from Hall effect (or variable reluctance) sensor 118 coupled to crankshaft 20 indicating engine speed.

Concentration of oxygen present in the exhaust system may be assessed by oxygen sensor 126. Further, an additional oxygen sensor (not shown) may be placed after catalyst 70. Oxygen sensor 126 senses engine feed-gas oxygen concentration while oxygen sensor. Oxygen sensors may be wide range sensors having a linearized output or they may be sensors that indicate a high gain signal near stoichiometric conditions. Further, driver pedal 130 is shown along with a driver's foot 132. Pedal position sensor (pps) 134 measures angular position of the driver actuated pedal.

It will be understood that the depicted engine 10 is shown only for the purpose of example and that the systems and methods described herein may be implemented in or applied to any other suitable engine having any suitable components and/or arrangement of components.

As discussed above, voltage supplied to a fuel injector during an engine start may vary as the engine crankshaft rotates. Further, fuel injector voltage may vary depending on battery strength, valve timing, and battery load. To improve the possibility of fuel injector operating during cold starting conditions, it may be beneficial to determine crankshaft angles at which fuel injector supply voltage is above the minimum fuel injector operating voltage. If the engine fuel injectors are actuated at crankshaft angles where fuel injector supply voltage is higher than the minimum fuel injector operating voltage, starting of the engine may be improved.

Referring now to FIG. 2A, a simulated plot of fuel injector supply voltage of a single cylinder engine during a cold start at a first engine speed is shown. The Y-axis represents fuel injector supply voltage, and the fuel injector supply voltage increase from the bottom to the top of the plot. The X-axis represents time, and time increases from the left to the right side of the plot. Fuel injector supply voltage 200 is shown varying with time and has a period of 720 crankshaft degrees for this case. In particular, as the engine rotates during cranking, engine cylinders go through intake, compression, expansion, and exhaust events. The plot illustrates fuel injector supply voltage relative to the strokes of one cylinder. Vertical lines indicated the beginning and end of cylinder strokes. In this example, intake stroke is abbreviated as INT., compression stroke as COMP., expansion stroke as EXP, and exhaust stroke as EXH. The figure shows that during the expansion stroke, the fuel injector supply voltage may reach the highest voltage value during the engine cycle. Further, during the intake stroke, a portion of fuel injector supply voltage may be low and then may increase part way through the cylinder stroke. If the fuel injector supply voltage exceeds the minimum fuel injector operating voltage during a portion of the intake stroke (e.g., during a crankshaft angular window), it may be desirable to operate the fuel injector during the crankshaft angle where fuel injector supply voltage is above the minimum fuel injector operating voltage. In cases where the engine has more than a single cylinder the voltage may repeat 720 crankshaft degrees divided by the number of cylinders.

Below the X-axis, FIG. 2A also indicates the period of one engine cycle which corresponds to the same interval as a cylinder cycle. During one engine cycle there may be a portion of time or crankshaft angle when the fuel injector supply voltage exceeds the minimum operating voltage of the fuel injector. This crankshaft angle may be referred to as the injection window. The injection window may vary depending on the available fuel injector supply voltage and the minimum fuel injector operating voltage. FIG. 2A shows an injection window relative to a cylinder cycle.

Referring now to FIG. 2B, similar to FIG. 2A, shows a simulated plot of fuel injector supply voltage for a single cylinder engine during a cold start, but at a second engine speed. Again, the Y-axis represents fuel injector supply voltage, and the fuel injector supply voltage increase from the bottom to the top of the plot. The X-axis represents time, and time increases from the left to the right side of the plot. Fuel injector supply voltage 202 is shown varying with time. FIG. 2B uses the same nomenclature and identification markings as FIG. 2A. FIG. 2B provides increased resolution of the fuel injector supply voltage over a cylinder cycle. Further, FIG. 2B indicates that the maximum voltage during the particular illustrated cylinder cycle occurs during the expansion stroke and is indicated by the MAX V label.

Figure 3:
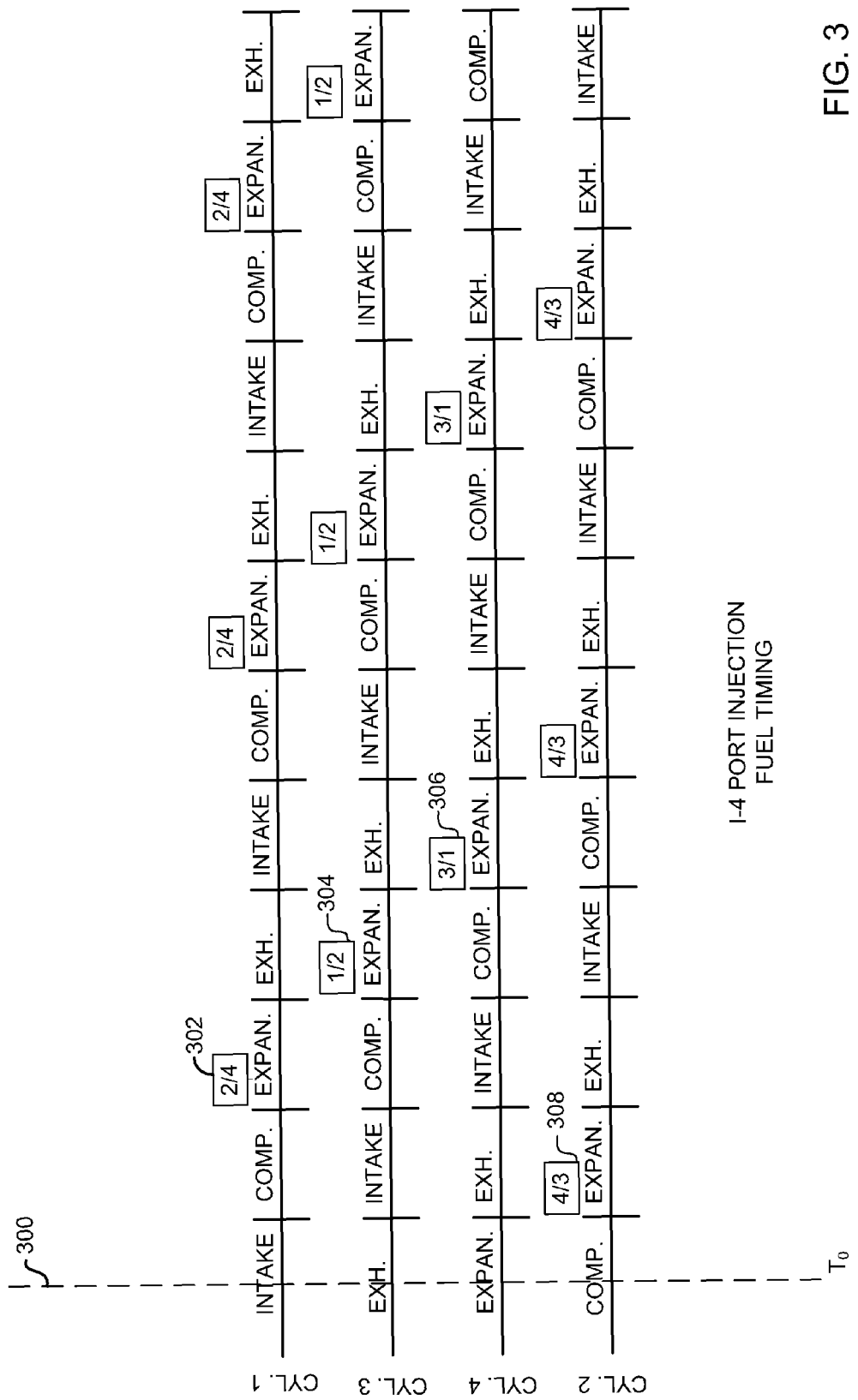
FIG. 3 shows a simulated plot of port fuel injection timing signals for an I-4 engine during a cold start.

Referring now to FIG. 3, a simulated plot of port fuel injection timing signals for an I-4 engine during a cold start is shown. Vertical marker indicates 300 the start of engine rotation during a cold engine start. The engine is stationary to the left of 300 and is shown in terms of cylinder strokes to the right of 300. The top trace represents cylinder number one engine position followed by cylinders three, four, and two. The vertical markers represent top dead center and bottom dead center piston positions in the respective cylinders.

The box marked 302 shows a window of fuel injector opening time when cylinder one is in an expansion stroke. The two numerals in the fuel injector opening time box indicate the cylinder numbers for which start of injection may be appropriate during the expansion stroke of cylinder number one. In this example, cylinder numbers two and four are indicated as the cylinder fuel injectors that may be operated. Notice that while cylinder number one is on an expansion stroke, cylinder number two is on an exhaust stroke and cylinder number four is on an intake stroke. Gaseous fuel may be injected during interval 302 to either cylinder number two or four. If gaseous fuel is injected to cylinder number two, some gas may enter the intake manifold before being inducted to cylinder number two. If gaseous fuel is injected to cylinder number four, a larger amount of fuel is likely to make it into cylinder number four as compared to if fuel were injected to cylinder number two. Similar injection timing is show for additional cycles of cylinder number one.

The fuel injector opening timing box marked 304 shows a window of fuel injector opening time when cylinder three is in an expansion stroke. The two numerals in the fuel injector opening timing box indicate the cylinder numbers for which start of injection may be appropriate during the expansion stroke of cylinder number one. Again, the two numerals in the fuel injector opening timing box indicate the cylinder numbers for which start of injection may be appropriate during the expansion stroke of cylinder number three. Cylinder numbers one and two are indicated as the cylinder fuel injectors that may be operated. Cylinder number two is on an exhaust stroke and cylinder number four is on an intake stroke during this period. Accordingly, injection by either fuel injector on the same basis as described above is possible. Similarly, fuel injector opening timing boxes 306 and 308 indicate possible fuel injection timings for cylinders three and one, and four and three.

It should be noted that the injection timing windows of FIGS. 3-6 are exemplary. The window may be any crankshaft interval when the fuel injector supply voltage is greater than a minimum fuel injector operating voltage or a threshold voltage.

Figure 4:
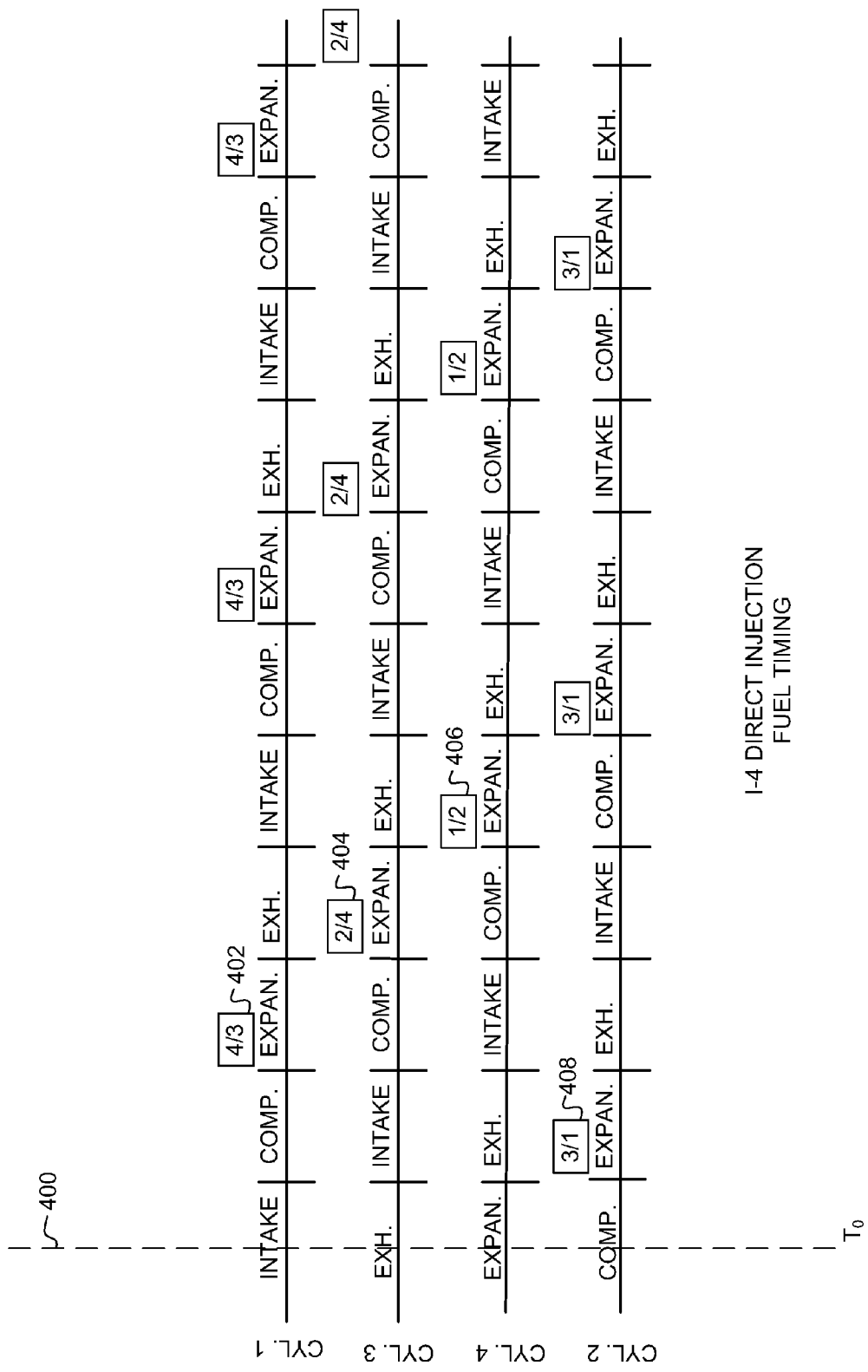
FIG. 4 shows a simulated plot of direct fuel injection timing signals for an I-4 engine during a cold start.

Referring now to FIG. 4, a simulated plot of direct fuel injection timing signals for an I-4 engine during a cold start is shown. Vertical marker 400 indicates the start of engine rotation during a cold engine start. Similar to FIG. 3, the engine is stationary to the left of 400 and is shown in terms of cylinder strokes to the right of 400. The labels and markers are the same between FIG. 3 and FIG. 4 with the exception of fuel injector opening timing boxes.

The fuel injector opening timing for a direct injection engine may be different from a port fuel injected engine in that a direct injection engine can inject fuel to a cylinder when the intake valve is open or while the cylinder is in a compression stroke to get fuel to a cylinder during a cylinder cycle. On the other hand, to get fuel into a cylinder during a particular cylinder cycle, a port fuel injector must inject fuel before the cylinder's intake valve opens or while the intake valve is open. And if gaseous fuel is injected to a cylinder when the cylinder's intake valve is closed, a portion of the injected fuel may enter the intake manifold and may be inducted to other cylinders. Thus, fuel injection timing for port and direct injection fuel systems may be different.

At fuel injector opening timing box 402, cylinder number one is on an expansion stroke. Since fuel injector supply voltage may be high at this time, it may be appropriate to inject fuel to cylinders number four and three. Notice that during the expansion stroke of cylinder number one, cylinder number four is on an intake stroke and cylinder number three is on a compression stroke. If fuel is injected to cylinder number four or three at the timing shown at 402, it is likely that most of the fuel injected will enter the respective cylinder rather than flowing to the intake manifold and other cylinders. Thus, when cylinder number one is on an expansion stroke it may be desirable to inject fuel to either cylinder number four or cylinder number three.

At fuel injector opening timing box 404, cylinder number three is on an expansion stroke. Since cylinder number two is on an intake stroke and cylinder number four is on a compression stroke it may be appropriate to inject to either or both of cylinders number two and four at the timing indicated by fuel injector opening timing box 404. Likewise, at 406 cylinder number four is on an expansion stroke while cylinder number one is on an intake stroke and cylinder number two is on a compression stroke. Therefore, at the timing of fuel injector opening timing box 406, it may be desirable to inject fuel to either or both of cylinders number one and two. Similarly, at fuel injector opening timing box 408, cylinder number two is on an expansion stroke while cylinder number three is on an intake stroke and cylinder number one is on a compression stroke. Consequently, at the timing of fuel injector opening box 408, it may be desirable to inject fuel to either or both of cylinders number three and one. As the engine rotates and engine position changes moving to the right of the plot, additional fuel injector opening timing boxes are indicated. Further, it should also be mentioned that once the engine is started and fuel injector voltage is above the minimum fuel injector operating voltage, fuel injector opening timing for each cylinder may be shifted to a base fuel injector timing that may be related to engine speed and load.

Unlike a four cylinder engine which may have a combustion event every 180 crankshaft degrees, a six cylinder engine may have a combustion event every 120 crankshaft degrees. Therefore, there is different overlap between cylinder strokes of a six cylinder engine as compared to a four cylinder engine. Further, the timing of one cylinder stroke may correspond to the timing of a portion of two cylinder strokes for a different cylinder. For example, during an expansion stroke of cylinder number one of a six cylinder engine, cylinder numbers five, three, two, and four rotate through portions of two other cylinder strokes (e.g., compression and expansion strokes). On the other hand, for a four cylinder engine, a cylinder stroke corresponds to a single cylinder stroke of another cylinder. For example, the expansion stroke of cylinder number one aligns with the timing of the compression stroke of cylinder number three. Accordingly, injection timing for a six cylinder engine during crankshaft intervals when fuel injector supply voltage is high may differ from that of a four cylinder engine.

Figure 5:
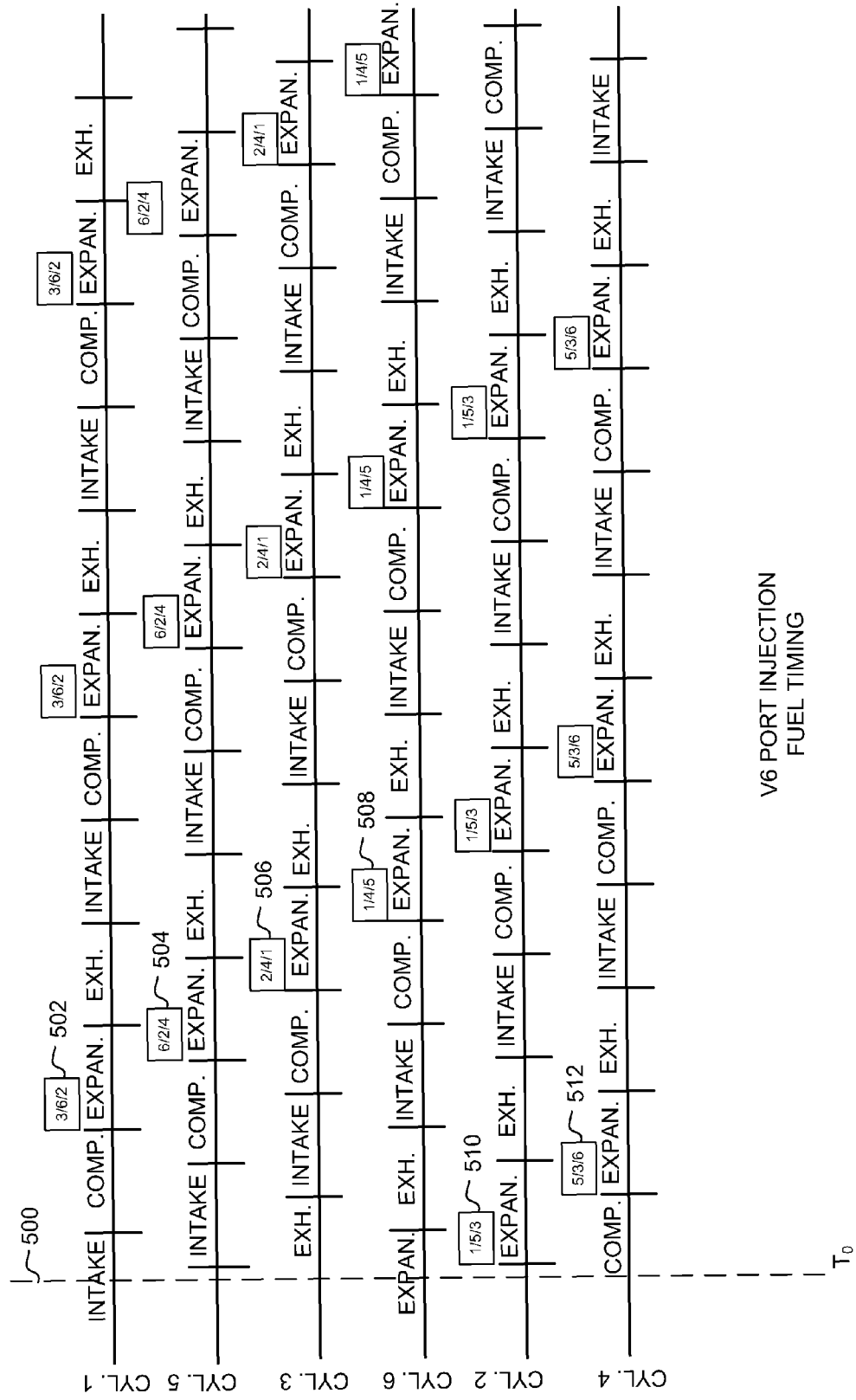
FIG. 5 shows a simulated plot of port fuel injection timing signals for a V-6 engine during a cold start.

Referring now to FIG. 5, a simulated plot of port fuel injection timing signals for a V-6 engine during a cold start is shown. Vertical marker indicates 500 the start of engine rotation during a cold engine start. The engine is stationary to the left of 500 and is shown in terms of cylinder strokes to the right of 500. The top trace represents cylinder number one engine position followed by cylinders five, three, six, two, and four. The vertical markers represent top dead center and bottom dead center piston positions in the respective cylinders.

Fuel injector opening timing box 502 shows a window of fuel injector opening time when cylinder one is in an expansion stroke. Three numerals in the fuel injector opening time box indicate the cylinder numbers for which start of injection may be appropriate during the expansion stroke of cylinder number one. In this example, cylinder numbers three, six, and two are indicated as the cylinder fuel injectors that may be operated. Notice that while cylinder number one is on an expansion stroke, cylinder number three is on an end of intake stroke, cylinder number six is on an intake stroke, and cylinder number four is on an exhaust stroke just prior to an intake stroke. If gaseous fuel is injected to cylinder number two, some gas may enter the intake manifold before being inducted to cylinder two. If gaseous fuel is injected to cylinders number three or six, a larger amount of fuel is likely to make it into cylinders number three and six as compared to if fuel were injected to cylinder number two.

Fuel injector opening timing boxes 504, 506, 508, 510, and 512 show timing similar to that of cylinder number one. However, the numbers indicated in the fuel injector timing boxes vary from cylinder to cylinder since the overlap between cylinder strokes is different between different cylinders. And like FIGS. 3 and 4, as the engine rotates and engine position changes moving to the right of the plot, additional fuel injector opening timing boxes are indicated. Further, as previously discussed, it should also be mentioned that once the engine is started and fuel injector voltage is above the minimum fuel injector operating voltage, fuel injector opening timing for each cylinder may be shifted to a base fuel injector timing that may be related to engine speed and load.

Figure 6:
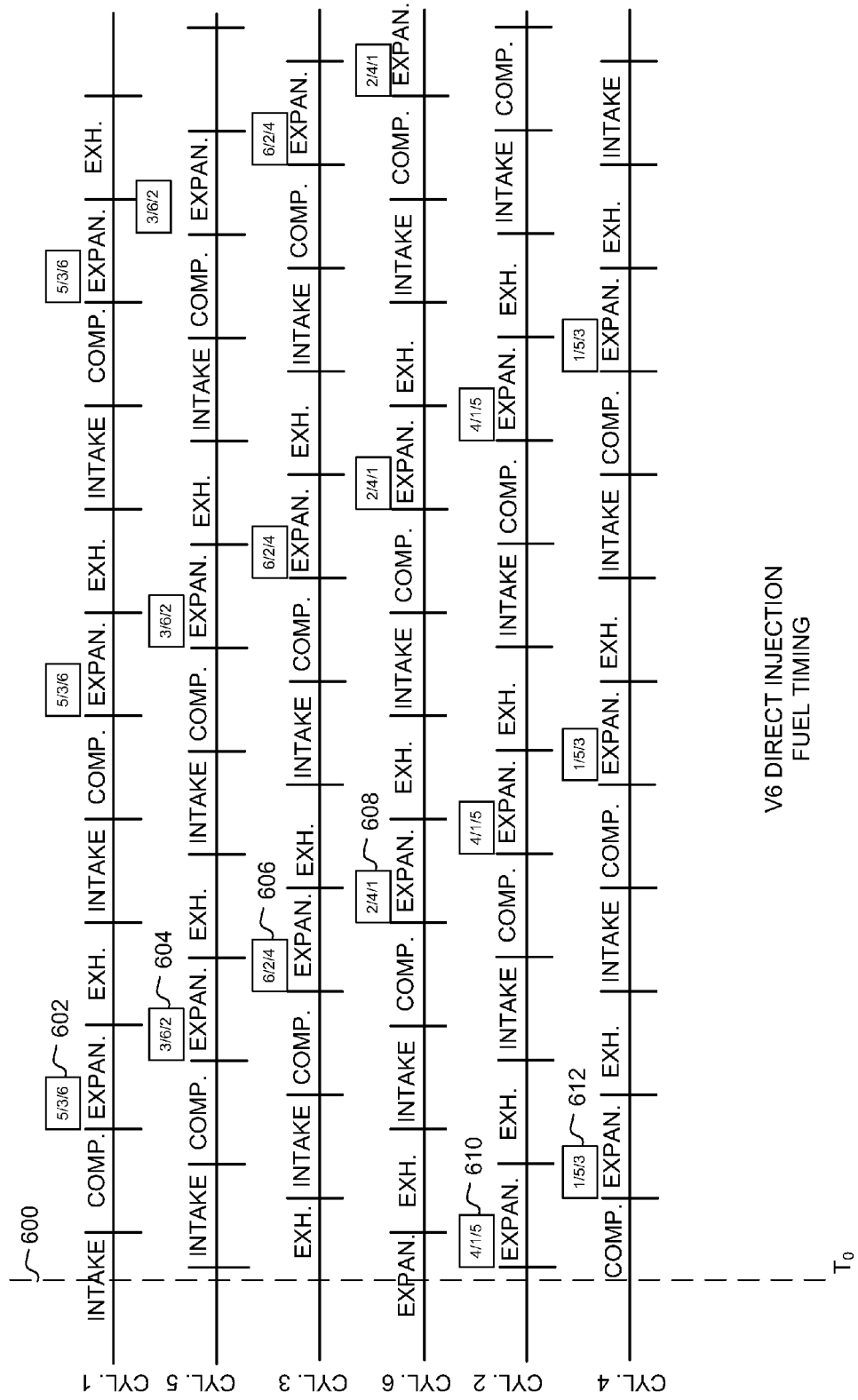
FIG. 6 shows a simulated plot of direct fuel injection timing signals for an V-6 engine during a cold start.

As previously discussed, the fuel injector opening timing for a direct injection engine is different from a port fuel injected engine in that a direct injection engine can inject fuel to a cylinder when the intake valve is open or while the cylinder is in a compression stroke to get fuel to a cylinder during a cylinder cycle. Also as mentioned above, cylinder stroke overlap is different between four and six cylinder engines. FIG. 6 shows an example of simulated fuel injector timing for a six cylinder direct injection engine.

Vertical marker indicates 600 the start of engine rotation during a cold engine start. The engine is stationary to the left of 600 and is shown in terms of cylinder strokes to the right of 600. The top trace represents cylinder number one engine position followed by cylinders five, three, six, two, and four. The vertical markers represent top dead center and bottom dead center piston positions in the respective cylinders.

Fuel injector opening timing box 602 shows a window of fuel injector opening time when cylinder one is in an expansion stroke. Three numerals in the fuel injector opening time box indicate the cylinder numbers for which start of injection may be appropriate during the expansion stroke of cylinder number one. In this example, cylinder numbers five, three, and six are indicated as the cylinder fuel injectors that may be operated. Notice that while cylinder number one is on an expansion stroke, cylinder number five is on a compression stroke, cylinder number three is on intake and compression strokes, and cylinder number six is on an intake stroke. If gaseous fuel is directly injected to cylinder number five, three, or six it is likely that most of the fuel will stay in the cylinder to which it was injected because the cylinder is on an intake stroke or because the intake valve of the cylinder is closed.

Fuel injector opening timing boxes 604, 606, 608, 610, and 612 show timing similar to that of cylinder number one. However, the numbers indicated in the fuel injector timing boxes vary from cylinder to cylinder since the overlap between cylinder strokes is different between different cylinders. And like FIGS. 3, 4, and 5, as the engine rotates and engine position changes moving to the right of the plot, additional fuel injector opening timing boxes are indicated. Further, as previously discussed, it should also be mentioned that once the engine is started and fuel injector voltage is above the minimum fuel injector operating voltage, fuel injector opening timing for each cylinder may be shifted to a base fuel injector timing that may be related to engine speed and load.

Figure 7:
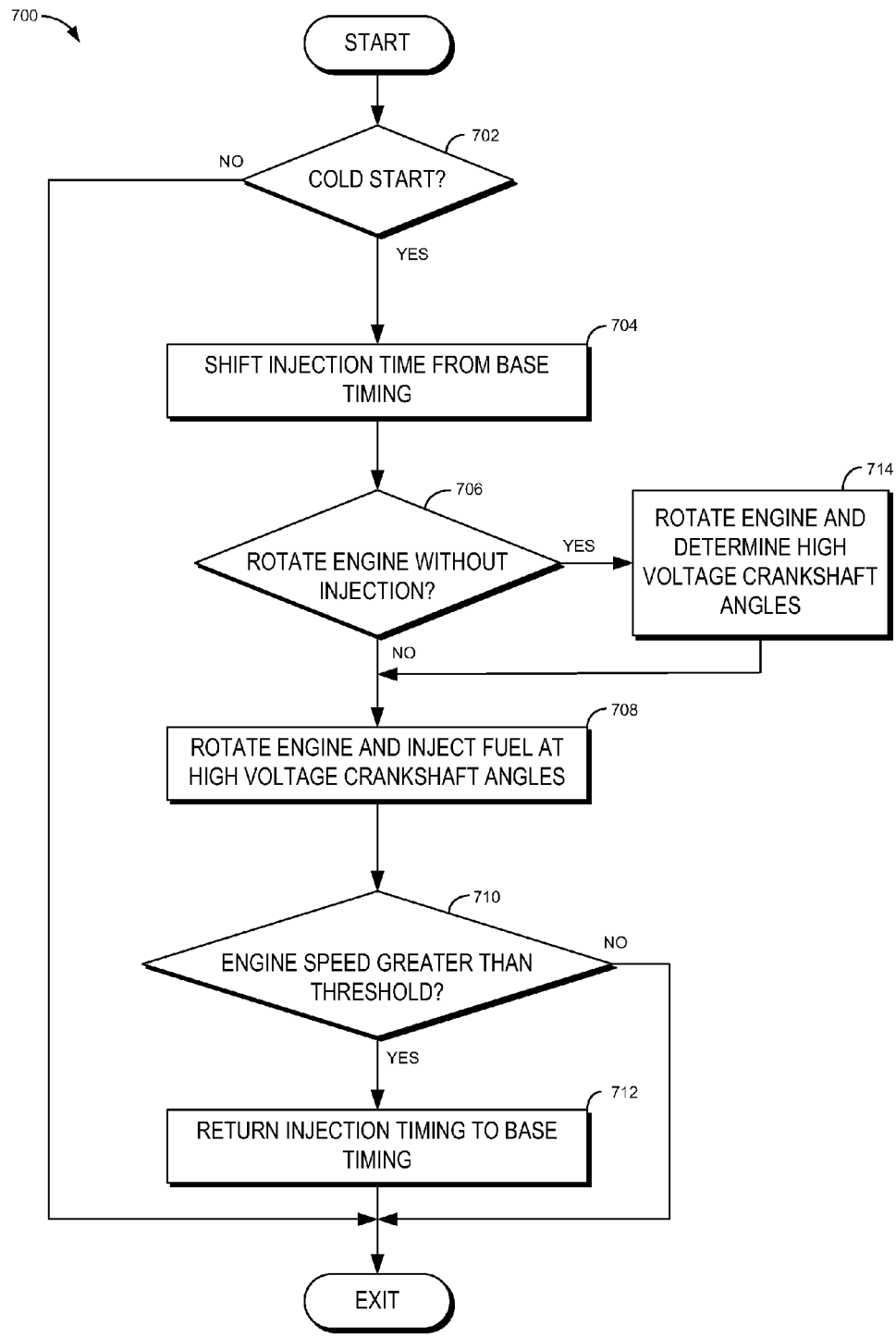
FIG. 7 a flow chart of a routine for a routine to control injection timing during a cold start is shown.

Referring now to FIG. 7, a flow chart of a routine to inject gaseous fuel to a cylinder is shown. It should be noted that the fuel injector timings illustrated by FIG. 3-6 are within the scope of the routine of FIG. 7. Further, routine may be programmed and executed by engine controller 12 of FIG. 1.

At 702, routine 700 judges whether or not the engine is being cold started. In one example, routine 700 may determine the state of engine operating parameters to determine if the engine is being cold started. For example, if engine coolant temperature is below a threshold temperature, and engine speed is below a threshold speed, it may be judged that the engine is experiencing a cold start.

At 704, routine 700 shifts from base fuel injector timing to cold start fuel injector timing. In one embodiment, base fuel injector timing may be empirically determined and related to engine speed and engine load. For example, when engine speed is low, a direct fuel injector may start to inject fuel during the compression stroke 160 crankshaft angle degrees before top dead center of the compression stroke. At higher engine speed, the direct fuel injector may start to inject fuel 20 crankshaft angle degrees before bottom dead center of the intake stroke. Thus, gaseous fuel injector opening may be aligned to a crankshaft angle related to engine speed and load. Specific fuel injector opening and closing timings may vary depending on the fuel injector characteristics, fuel type, and engine design. The shift of fuel injector timing may be performed before the first injection after an engine stop. In one embodiment, the fuel injector opening timing for each cylinder may be moved to a crankshaft angle when fuel injector supply voltage is expected to be highest during the crankshaft angle duration where it may be appropriate to inject fuel to a cylinder. For example, fuel injection to one cylinder may occur substantially near 60 crankshaft angle degrees into the expansion stroke of anther cylinder, the cylinder receiving fuel adjacent to and preceding the cylinder on an expansion stroke in an order of combustion of the engine. Appropriate fuel injection opening timing may be late during the exhaust stroke, during the intake stroke, or during the compression stroke of the cylinder to which fuel is injected. Further, the injection timing may vary with engine temperature.

Thus, during an engine start in a first mode, fuel injecting timing of a gaseous fuel may be adjusted to deliver at least a portion of gaseous fuel to a cylinder during different crankshaft intervals. And, during a second mode, fuel injection timing of a gaseous fuel may be adjusted in response to engine speed and load.

At 706, routine 700 judges whether to rotate the engine without injecting fuel to the engine. In one embodiment, it may be desirable to rotate an engine through an engine cycle or at least a portion of an engine cycle to determine at what crankshaft angle fuel injector supply voltage is greater than minimum fuel injector operating voltage (e.g., at the peak or substantially maximum measured voltage during an engine cycle). The engine may be rotated an entire revolution, half a revolution, or some fraction thereof without injecting fuel to the engine. Judgment as to whether or not to rotate the engine may be based on whether or not the engine controller is preconfigured with crankshaft angles where fuel injector supply voltage is expected to be high. If the engine controller is programmed with crankshaft angles where injector supply voltage is expected to be high stored in memory, routine 700 may proceed to 708 where the engine is rotated and fuel is injected to start the engine.

At 714, routine 700 causes the engine to rotate one revolution or at least a portion of a revolution without fueling the engine. While the engine is rotating, routine 700 may records crankshaft intervals over which the fuel injector supply voltage exceeds the minimum fuel injector operating voltage. In one embodiment, the fuel injector supply voltage may be monitored at each individual fuel injector. In other embodiments, a single voltage between the voltage source and the fuel injectors may be monitored.

At 708, routine 700 injects fuel to the engine while the engine is rotating so that the engine may be started. In one embodiment where the engine controller is programmed with crankshaft intervals when fuel injector supply voltage is expected to be greater than fuel injector minimum operating voltage, the crankshaft intervals may then be matched up with cylinders for which fuel injection is appropriate during the particular crankshaft interval. For example, if the fuel injector supply voltage is expected to be high during the crankshaft interval of between 0 and 60 crankshaft angle degrees of cylinder number one expansion stroke, it may be desirable to inject gaseous fuel directly to cylinder four or three according to the timings indicated by FIG. 4. Thus, the opening of a gaseous fuel injector may occur within a crankshaft interval of an expansion stroke of a cylinder adjacent to and preceding the cylinder in an order of combustion of the engine. In other words, fuel may be injected to one cylinder while another cylinder is in an expansion stroke or a stroke when fuel injector supply voltage exceeds the fuel injector minimum operating voltage.

In another embodiment, routine 700 may monitor fuel injector supply voltage as the engine rotates. When fuel injector supply voltage exceeds the minimum supply voltage, a fuel injector for a cylinder near or on an intake or compression stroke may be opened to deliver fuel to the cylinder.

In still another embodiment, if routine 700 has just proceeded from 714, fuel may be injected at the crankshaft intervals when fuel injector supply voltage exceeds the minimum fuel injector operating voltage. Again, fuel may be injected to cylinders at which it may be appropriate to inject fuel when the fuel injector supply voltage exceeds the minimum fuel injector operating voltage.

In still another embodiment, fuel injection timing can be adjusted so that a gaseous fuel injector delivers at least a portion of gaseous fuel to a cylinder of an engine during different crankshaft intervals, wherein said different crankshaft intervals correspond to maximum battery voltage when the battery voltage is cyclically varying due to cylinder gas torques.

Thus, at 708, routine 700 aligns start of fuel injector opening for each cylinder to coincide with a crankshaft interval when fuel injector supply voltage may be greater than minimum fuel injector operating voltage. In this way, fuel injector timing is adjusted based on fuel injector supply voltage so that the possibility of injecting fuel to start the engine during cold conditions may be improved. In addition, the duration that a fuel injector is opened while fuel injector opening timing is aligned to fuel injector supply voltage above a threshold, may vary with ambient or engine temperature. For example, additional fuel may be injected to a cold engine to account for a higher air density.

At 710, routine 700 judges whether the engine is started. In one embodiment, routine judges the engine is started if the engine speed exceeds a threshold speed for a predetermined amount of time. If engine speed has not exceeded a threshold, routine 700 proceeds to exit. If engine speed has exceeded a threshold, routine 700 proceeds to 712.

At 712, routine 700 returns injection timing to base timing from fuel injector supply voltage based timing. In one example, injection opening timing of each cylinder may be moved sequentially according to the engine combustion order. Injection timing adjustments are made for cylinders when fuel is not being injected to the cylinder so that fuel injection is not interrupted by the injection timing change. After shifting fuel injector timing from fuel injector supply voltage based timing to base fuel injector timing, routine 700 proceeds to exit.

Note that if routine 700 exits without shifting fuel injector timing from fuel injector supply voltage based timing to base fuel injector timing, routine 700 may be executed repeatedly until the engine starts or the engine start request is withdrawn.

In yet another embodiment, a method for injecting fuel to an engine comprises during an engine start in a first mode, adjusting injection timing of a gaseous fuel injector to deliver at least a portion of gaseous fuel to a cylinder of an engine during different crankshaft intervals, wherein said different crankshaft intervals correspond to maximum battery voltage when the battery voltage is cyclically varying due to cylinder gas torques.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for injecting fuel, comprising:
during a first mode, rotating an engine without fueling during a revolution of the engine, recording crankshaft angles where an injector supply voltage exceeds a minimum fuel injector operating voltage, and aligning opening of at least two of a plurality of gaseous fuel injectors during a subsequent revolution of the engine at the recorded crankshaft angles.

2. The method of claim 1, wherein said opening of said at least two of said plurality of gaseous fuel injectors occurs within crankshaft intervals of expansion strokes of two cylinders adjacent to and preceding cylinders in an order of combustion of said engine receiving fuel from said at least two of said plurality of gaseous fuel injectors.

3. The method of claim 1, where the recorded crankshaft angles correspond to a maximum battery voltage when a battery voltage is cyclically varying due to cylinder gas torques.

4. The method of claim 1, further comprising during a second mode, sensing said injector supply voltage during engine cranking and opening said at least two of said plurality of gaseous fuel injectors when said injector supply voltage exceeds said minimum fuel injector operating voltage.

5. The method of claim 1, wherein the plurality of gaseous fuel injectors are saturating fuel injectors.

6. The method of claim 1, wherein opening said at least two of said plurality of gaseous fuel injectors occurs during at least a portion of expansion strokes of two cylinders.

7. The method of claim 6, where a peak voltage of said injector supply voltage occurs substantially near 60 crankshaft angle degrees after top dead center compression stroke of a cylinder, and where one of the at least two of said plurality of gaseous fuel injectors open at the peak voltage.

8. The method of claim 1, further comprising during a start in a second mode, adjusting injection timing of said plurality of gaseous fuel injectors to deliver a gaseous fuel to engine cylinders at a different timing than during said first mode.

9. The method of claim 1, further comprising adjusting fuel injection timing to a base timing in response to an engine speed greater than a threshold engine speed.

10. The method of claim 1, further comprising opening one of the at least two of the plurality of gaseous fuel injectors during an engine cycle subsequent to an engine stop and to said at least one rotation, opening of one of the at least two of the plurality of gaseous fuel injectors occurring when said injector supply voltage of said plurality of gaseous fuel injectors is at substantially a peak value during a crankshaft interval.

11. A system, comprising:
an engine including a cylinder; and
a gaseous fuel injector injecting a fuel to the cylinder of the engine;
a controller including an electronic storage medium, the electronic storage medium including instructions to:
during a first mode, aligning opening of said gaseous fuel injector to a crankshaft angle in response to a supply voltage of said gaseous fuel injector exceeding a threshold voltage; and
during a second mode, aligning opening of said gaseous fuel injector to a crankshaft angle related to a speed and a load of said engine, said second mode entered in response to a temperature of said engine at or above a threshold temperature.

12. The system of claim 11, further comprising rotating a crankshaft of said engine through at least one revolution before said opening of said gaseous fuel injector during said first mode.

13. The system of claim 11, where the first mode further includes said opening of said gaseous fuel injector where said crankshaft angle corresponds to a maximum voltage supplied to said gaseous fuel injector from at least one of a battery and an alternator.

14. The system of claim 11, where the first mode further includes adjusting an opening duration of said gaseous fuel injector as a temperature of said engine varies.

15. The system of claim 11, where the first mode includes injecting a first amount of fuel and where the second mode includes injecting a second amount of fuel, the first amount of fuel greater than the second amount of fuel.

* * * * *